(12) United States Patent
Ye et al.

(10) Patent No.: US 11,903,433 B2
(45) Date of Patent: Feb. 20, 2024

(54) MULTI-LAYERED COATED FABRIC FOR PERSONAL PROTECTIVE EQUIPMENT (71) Applicant: HONEYWELL INTERNATIONAL INC., Charlotte, NC (US)

(72) Inventors: Tianshi Ye, Shanghai (CN); Xiaowei Chen, Shanghai (CN); Jing Zhang, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 130 days.

(21) Appl. No.: 17/217,407

(22) Filed: Mar. 30, 2021

(65) Prior Publication Data
US 2021/0330004 A1 Oct. 28, 2021

(30) Foreign Application Priority Data

Apr. 24, 2020 (CN) .......................... 202010333804.9

(51) Int. Cl.
*A41D 19/00* (2006.01)
*A41D 19/015* (2006.01)
(Continued)

(52) U.S. Cl.
CPC ... *A41D 19/0065* (2013.01); *A41D 19/01558* (2013.01); *D06M 11/65* (2013.01);
(Continued)

(58) Field of Classification Search
None
See application file for complete search history.

(56) References Cited

U.S. PATENT DOCUMENTS

| 10,349,690 B2 * | 7/2019 | Francisco Costa .......................... A41D 19/0065 |
| 2006/0189240 A1 | 8/2006 | Taylor et al. |

(Continued)

FOREIGN PATENT DOCUMENTS

| EP | 1671555 A1 | 6/2006 |
| EP | 2143551 A1 | 1/2021 |

(Continued)

OTHER PUBLICATIONS

BM Polyco Grip It Microfoam Nitrile-Coated Gloves, Size 9, Blue, Chemical Resistant, Model No. GIOG1/09, https://uk.rs-online.com/web/p/work-gloves/1240686/. Accessed Mar. 5, 2020. (4 pages).

(Continued)

*Primary Examiner* — Arti Singh-Pandey
(74) *Attorney, Agent, or Firm* — Alston & Bird LLP (57) ABSTRACT A coating fabric and method of manufacturing the same are provided. A coated fabric includes a base coating layer. The base coating layer defines a smooth coating to resist liquid penetration to the fabric. The coated fabric also includes a middle foam coating layer that is deposited on at least a portion of the base coating layer. The middle foam layer defines a middle layer foam density and is configured to absorb at least a portion of liquid. The coated fabric further includes an outer foam coating layer that is deposited on at least a portion of the middle foam coating later. The outer foam layer defines an outer layer foam density and is configured with holes to allow liquid to penetrate to the middle foam layer. The middle layer foam density is less than the outer layer foam density. A corresponding method of manufacturing is also provided.

9 Claims, 6 Drawing Sheets (51) Int. Cl.
*D06M 11/65* (2006.01)
*D06M 15/693* (2006.01)
*D06N 3/00* (2006.01)
*D06N 3/10* (2006.01)
*D06N 3/18* (2006.01)

(52) U.S. Cl.
CPC ........ *D06M 15/693* (2013.01); *D06N 3/0043* (2013.01); *D06N 3/103* (2013.01); *D06N 3/106* (2013.01); *D06N 3/183* (2013.01); *D06N 2211/103* (2013.01); *D06N 2213/02* (2013.01); *Y10T 442/3341* (2015.04)

(56) References Cited

U.S. PATENT DOCUMENTS

2007/0259984 A1  11/2007  Dorr et al.
2008/0125688 A1* 5/2008  Kellogg ............... A61F 13/10
                                                       602/61
2015/0135403 A1  5/2015  Mercado et al.
2016/0262469 A1* 9/2016  Fernando ............... D04B 1/28
2017/0332714 A1* 11/2017 Gutiérrez ............... B29C 35/02

FOREIGN PATENT DOCUMENTS

| WO | 1995/026650 A1 | 10/1995 | |
|----|----|----|----|
| WO | 2016/141409 A1 | 9/2016 | |
| WO | WO-2021070010 A1 * | 4/2021 | ......... A41D 19/0055 |
| WO | WO-2022064355 A1 * | 3/2022 | |

OTHER PUBLICATIONS

Extended European Search Report issued in European Application No. 21167938.6 dated Sep. 24, 2021, 9 pages.

\* cited by examiner

MULTI-LAYERED COATED FABRIC FOR PERSONAL PROTECTIVE EQUIPMENT

CROSS-REFERENCE TO RELATED APPLICATIONS

This application claims priority pursuant to 35 U.S.C. 119(a) of China Patent Application No. 202010333804.9, filed Apr. 24, 2020, which application is incorporated herein by reference in its entirety.

TECHNOLOGICAL FIELD

Example embodiments of the present application relate generally to high performance coating materials, and, more particularly, to coated fabrics.

BACKGROUND

Applicant has identified a number of deficiencies and problems associated with traditional gloves in that they are inadequate at providing both sufficient grip and abrasion resistance in wet or oily environments. Through applied effort, ingenuity, and innovation, many of these identified problems have been solved by developing solutions that are included in embodiments of the present disclosure, many examples of which are described in detail herein.

BRIEF SUMMARY

Example embodiments of the present disclosure are directed to a triple layer coated fabric and associated methods of manufacturing. In an example embodiment, a coated fabric is provided. The coated fabric includes a base coating layer. The base coating layer defines a smooth coating to resist liquid penetration to the fabric. The coated fabric also includes a middle foam coating layer that is deposited on at least a portion of the base coating layer. The middle foam layer defines a middle layer foam density and the middle foam layer is configured to absorb at least a portion of liquid. The coated fabric further includes an outer foam coating layer that is deposited on at least a portion of the middle foam coating later. The outer foam layer defines an outer layer foam density and the outer foam layer is configured with holes to allow liquid to penetrate to the middle foam layer, such that the outer foam layer increases the abrasion resistance of the coated fabric. The middle layer foam density is less than the outer layer foam density.

In some embodiments, the middle layer foam density is from 0.25 kg/L to 0.60 kg/L. In some embodiments, the middle layer foam density is from 0.45 kg/L to 0.60 kg/L. In some embodiments, the outer layer foam density is from 0.70 kg/L to 0.9 kg/L. In some embodiments, at least one of the base coating layer, the middle foam coating layer, or the outer foam coating layer includes a nitrile compound. In some embodiments, the nitrile compound of the at least one of the base coating layer, the middle foam coating layer, or the outer foam coating layer includes 45% nitrile latex. In some embodiments, the coated fabric is used to form a glove. In some embodiments, each of the base coating layer, the middle foam coating layer, and the outer foam coating layer are applied at least to a palm area of the glove. In some embodiments, the glove is one of a mechanical glove or a chemical glove. In some embodiments, the base coating layer further includes a nylon lining.

In another example embodiment, a method of manufacturing a coated fabric is provided. The method includes applying a base coating layer formulation. The base coating layer defines a smooth coating to resist liquid penetration to the fabric. The method also includes applying a middle foam coating layer formulation on at least a portion of the base coating layer. The middle foam layer defines a middle layer foam density and the middle foam layer is configured to absorb at least a portion of liquid. The method further includes applying an outer foam coating layer formulation on at least a portion of the middle foam coating layer.

The outer foam layer defines an outer layer foam density and the outer foam layer is configured with holes to allow liquid to penetrate to the middle foam layer, such that the outer foam layer increases the gripping ability and abrasion resistance of the coated fabric. The middle layer foam density is less than the outer layer foam density.

In some embodiments, the method also includes applying a first coagulant to the fabric prior to the step of applying the base coating layer. In some embodiments, the method also includes applying the first coagulant to the fabric prior to the step of applying the middle foam coating layer. In some embodiments, the method also includes applying a second coagulant to the fabric prior to the step of applying the outer foam coating layer. In some embodiments, the method also includes applying a third coagulant to the fabric prior to the step of applying the outer foam coating layer. In some embodiments, the method also includes heating the coated fabric on a hand model prior to the step of applying the base coating layer. In some embodiments, the method also includes heating the coated fabric after the step of applying the outer foam coating layer. In such an embodiment, at least one of the base coating layer, the middle foam coating layer, or the outer foam coating layer are vulcanized in response to the heat. In some embodiments, the applying the outer foam coating layer further comprises washing out the uncoagulated coating on the surface of the fabric after the application of the outer foam coating layer. In some embodiments, the first coagulant is a calcium nitrate compound, the second coagulant is a acetic acid compound, and the third coagulant is a calcium nitrate compound. In some embodiments, the coated fabric is a glove.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example.

Grip performance is one of the key features to a useful working glove. In environments with heavy exposure to liquids (e.g., water or oil), traditional gloves may not allow for the user's hands to remain dry, which affects the gripping ability of the glove. Additionally, traditional gloves with desirable gripping characteristics lack the abrasion resistance desired. Various embodiments of the present disclosure thus allow for, in some examples, abrasion resistant fabric that maintains high gripping performance by using a middle foam coating layer to absorb liquid, while an outer foam coating layer, in some examples, provides the abrasion resistance. Various embodiments herein discuss use with gloves, but the coating process and coated fabrics of example embodiments may be used in various applications.

As discussed herein, example embodiments may be described with reference to a coating process that allows, in some examples, for optimized grip and abrasion resistance when applied to gloves (e.g., mechanical or chemical gloves) or other wearables, such as other personal protection equipment (e.g., helmets and/or protective shoes). In this regard, fabric, composite or other structures as described herein as coated fabric may, in some examples, refer to a three coating layer structure. For the sake of clarity of description, example embodiments of the present application are herein described with reference to "three layers" refer to the number of coating layers (e.g., a base coating layer, a middle foam coating layer, and an outer foam layer) and may not include additional non-coating layers, such as a glove liner. Alternatively or additionally layers to the "three layers" may be used in some embodiments whereas fewer layers as compared to the "three layers" may be used in other embodiments.

Figure 1A:
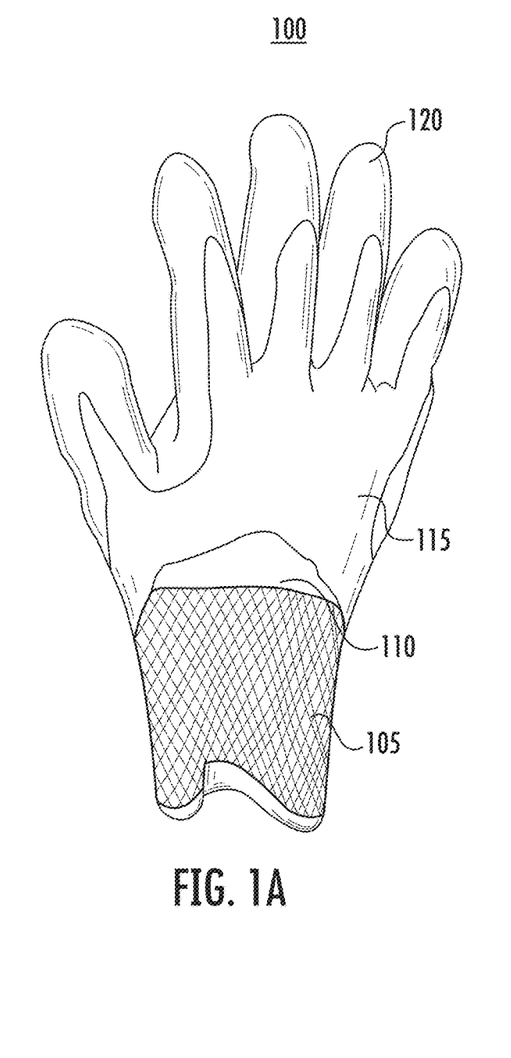
FIGS. 1A and 1B illustrates a three layer coated fabric of the present disclosure implemented in an example coated glove.
Figure 1B:
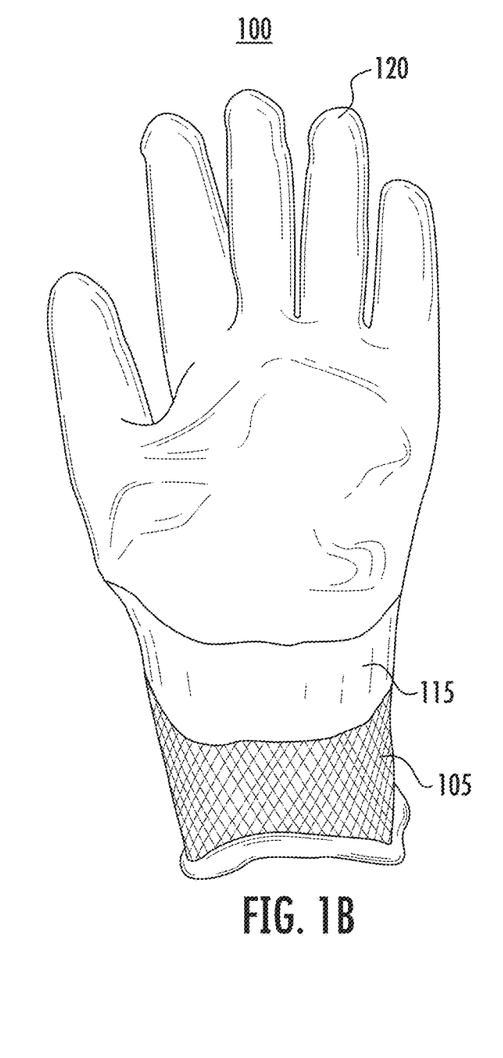

With reference to FIG. 1, a coated glove 100 implementing and/or otherwise composed of an example three layer coating is illustrated. As shown, the glove 100 may be manufactured or otherwise formed with three layers of coating manufactured in line with an example embodiments discussed herein. For example, the glove 100 may have a fabric 105, a base coating layer 110, a middle foam coating layer 115, and an outer foam layer 120. As shown, the coatings 110, 115, 120 may be applied to at least a portion of the glove (e.g., all three coatings are applied to the palm where they may be most useful during operation). In a preferred embodiment, the base coating layer 110 may be defined at least in the palm region and the interior of each digit of the coated fabric (e.g., in an instance in which the fabric is a glove shape). For example, the base coating layer 110 may coating wrap partially around each digit at a digit proximal end and completely around the digit at a digit distal end. In various embodiments, the middle foam coating layer 115 may be deposited on at least a portion the base coating layer 110, such that the middle foam coating layer 115 may be defined at least in the palm region and the interior of each digit of the coated fabric (e.g., in an instance in which the fabric is a glove shape). In various embodiments, the outer foam coating layer 120 may be deposited on at least a portion the middle foam coating layer 115, such that the outer foam coating layer 120 may be defined at least in the palm region and the interior of each digit of the coated fabric (e.g., in an instance in which the fabric is a glove shape). In various embodiments, the three layer coated fabric and method of manufacturing the same may be used in either chemical gloves or mechanical gloves. In various embodiments, the material of the fabric 105 may depend on the type of glove. In various embodiments, the fabric 105 may be any material that is capable of being coated with the base coating later 110. For example, the fabric 105 may be a glove liner. In various embodiments, the fabric 105 may be a material used for a mechanical or chemical glove. In various embodiments, the fabric 105 may be a material such as nylon, polyester, cotton, high-performance polyethylene (HPPE), aramid, stainless steel, glass fiber, rayon, polypropylene (PP), basalt, spandex, and/or the like.

In various embodiments, the three layer coated fabric and method of manufacturing the same may also be used in various applications, not limited to gloves. In various embodiments, the three layer coating discussed herein may be applied to other PPE. In an example embodiment, the three layer coating discussed herein may be applied to a helmet. For example, the base coating layer 110 may be applied to at least a portion of the helmet material, with the middle foam coating layer 115 applied at least partially onto the base coating layer 110, and the outer foam coating layer 120 applied at least partially onto the middle foam coating layer 115. In an example embodiment, the three layer coating discussed herein may be applied to a protective shoe. For example, the base coating layer 110 may be applied to at least a portion of the protective shoe material, with the middle foam coating layer 115 applied at least partially onto the base coating layer 110, and the outer foam coating layer 120 applied at least partially onto the middle foam coating layer 115. In various embodiments, the three layer coating may be applied to various other applications with similar results to those discussed herein.

Figure 2:
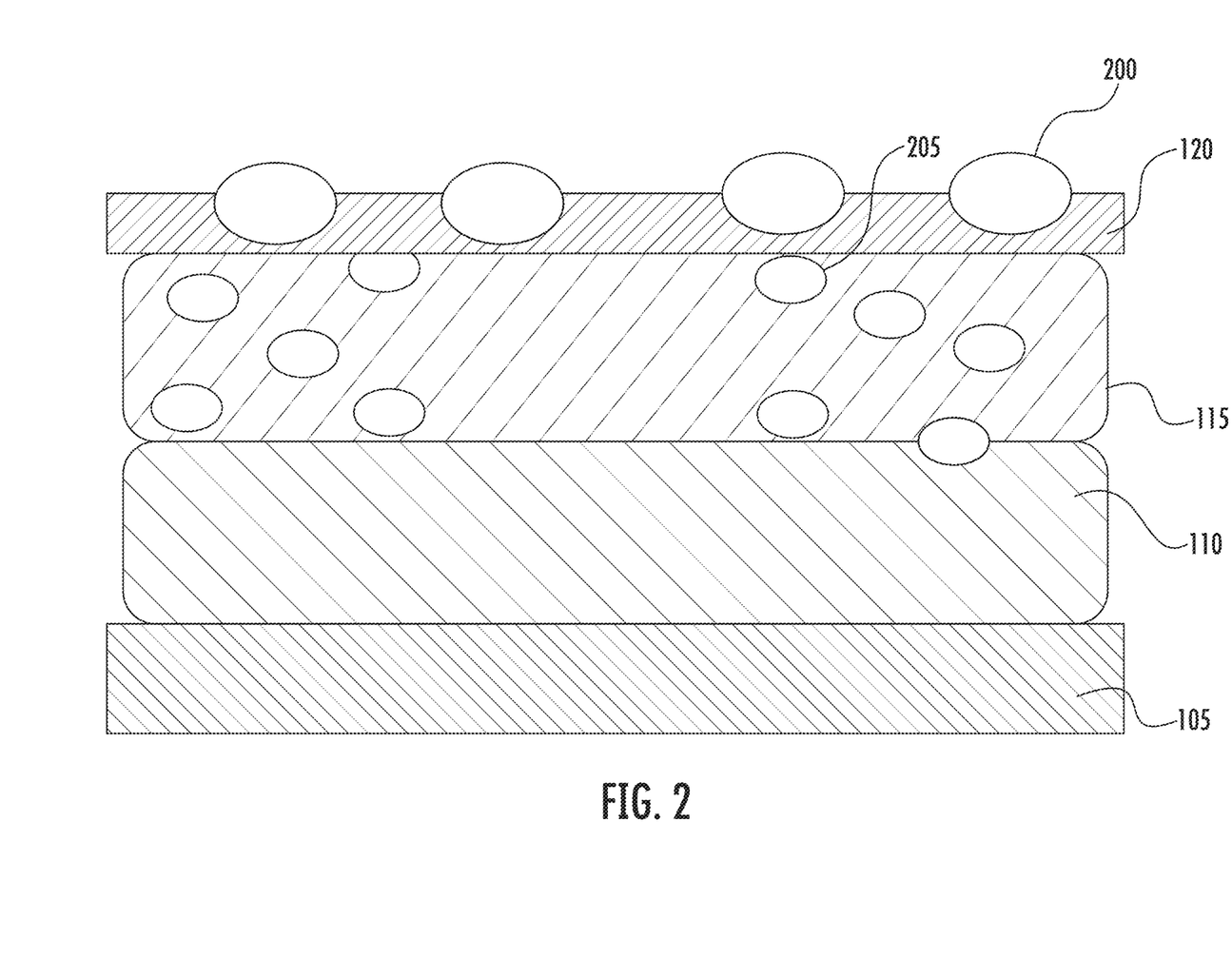
FIG. 2 is a cross-sectional view of a three layer coated fabric in accordance with an example embodiment of the present disclosure.
Figure 3A:
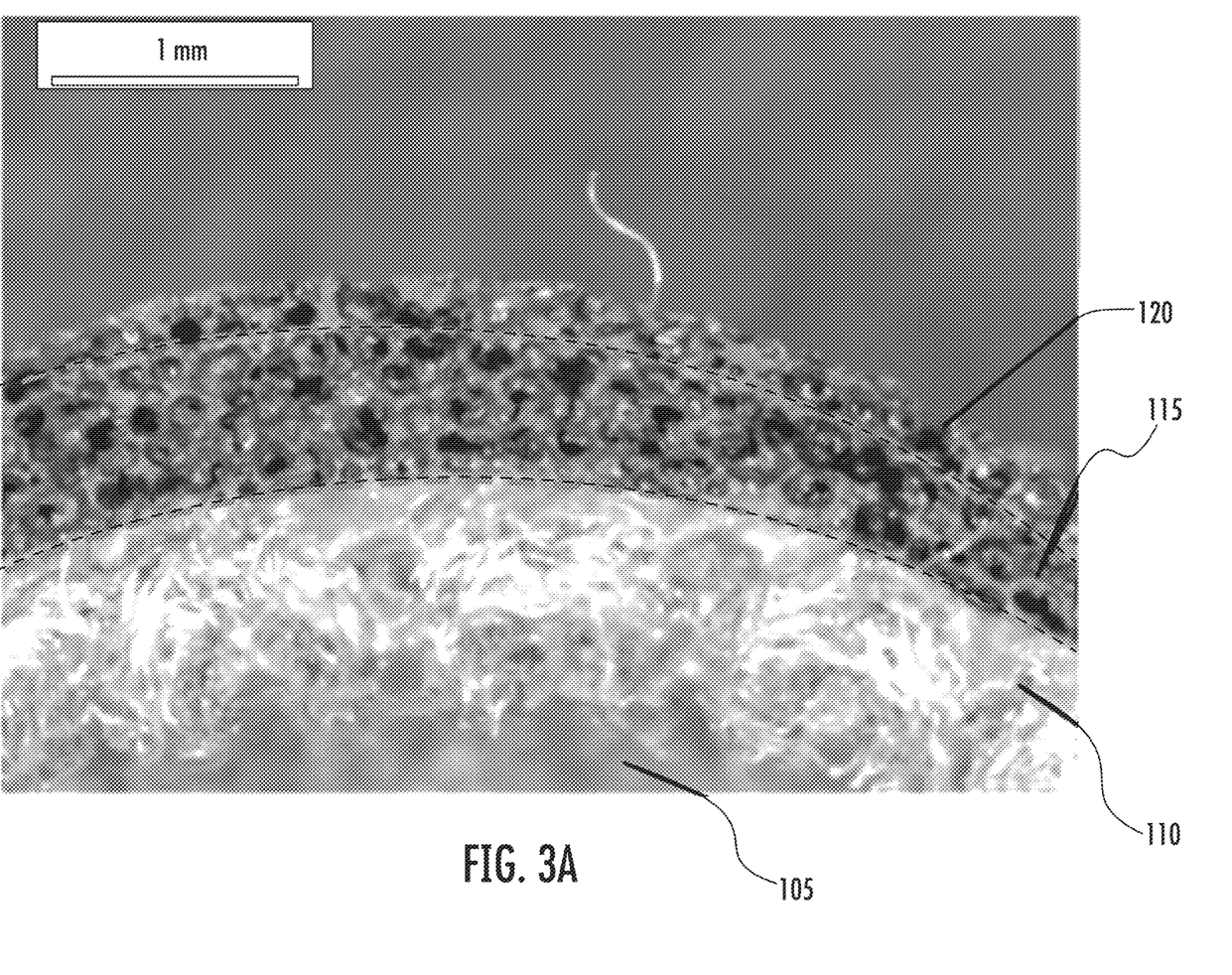
FIG. 3A is a micro cross-sectional view of the three layer coated fabric in accordance with an example embodiment of the present disclosure.
Figure 3B:
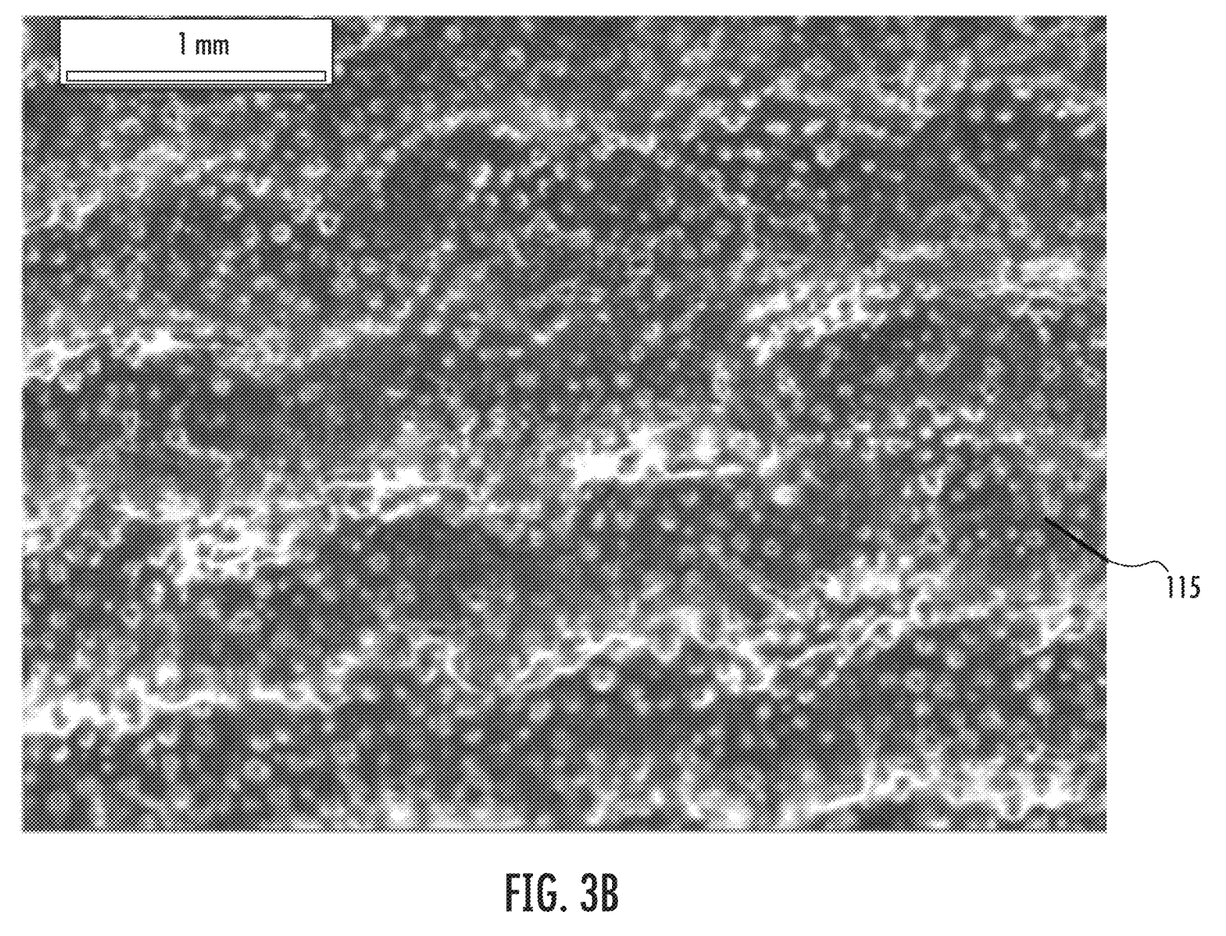
FIG. 3B is a micro view of the middle foam coating layer in accordance with an example embodiment of the present disclosure.
Figure 3C:
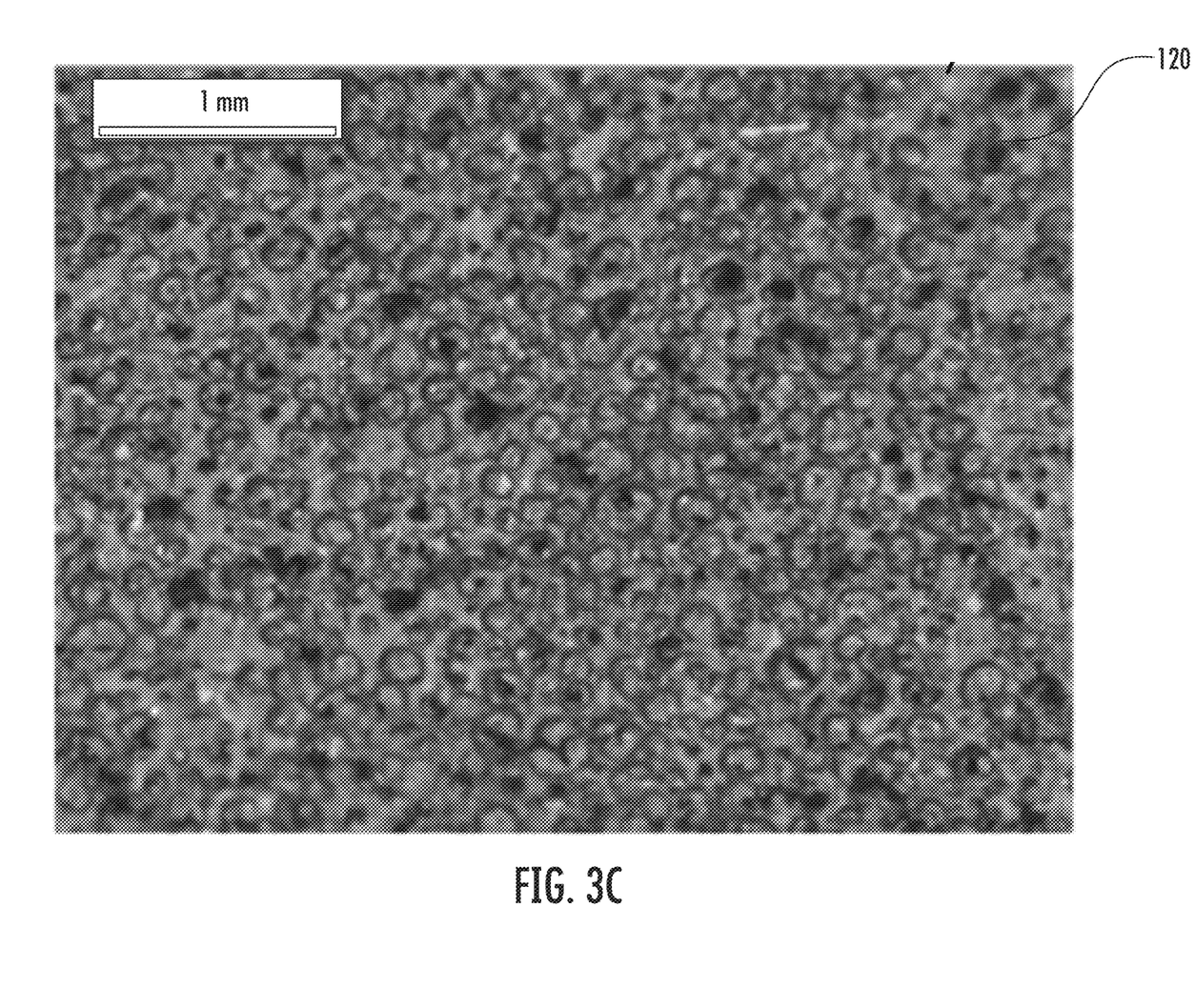
FIG. 3C is a micro view of the outer foam coating layer in accordance with an example embodiment of the present disclosure.

FIGS. 2 and 3A are cross-sectional views of a three layer coating in accordance with an example embodiment. Additionally, FIG. 3B is a micro view of the middle foam coating layer 115 of an example embodiment and FIG. 3C is a micro view of the outer foam coating layer 120 of an example embodiment. In various embodiments, the base coating layer 110 may be a smooth nitrile coating. In various embodiments, the base coating layer 110 may include a composite of at least one of a nitrile latex (e.g., X 6617 and/or XVT-LA), pH modifier (e.g., KOH solution), curing package (e.g., Sulphur dispersion, ZDEC dispersion, and/or ZnO dispersion), pigment/filler (e.g., TiO2 and/or Black pigment), and/or thickening agent (e.g., CMC solution). In various embodiments, the base coating layer 110 may be approximately 40% to 60% nitrile latex. In various embodiments, the base coating layer 110 may be approximately 40% to 50% nitrile latex. For example, the base coating layer 110 may be approximately 45% nitrile latex. In various embodiments, the base coating layer 110 may be relatively thin (e.g., less than the middle foam coating layer 115). In an example embodiment, the base coating layer 110 may be approximately 0.10 millimeters to 0.20 millimeters thick. In various embodiments, the base coating layer 110 may be thinner and/or thicker in various examples based on the abrasion resistance and/or grip requirements of the coated fabric.

In various embodiments, the middle foam coating layer 115 may be a microfoam coating. In an example embodiment, the middle layer foam density may be approximately 0.25 kilograms (kg) per Liter (L) to approximately 0.60 kg/L. In some embodiment, the middle foam density may be from approximately 0.45 kg/L to approximately 0.60 kg/L. For example, the middle layer foam density may be approximately 0.60 kg/L. In various embodiments, the middle foam coating layer 115 may have approximately 50 bubbles per square millimeter. In various embodiments, the lower the foam density, the higher the amount of bubbles per square millimeter. In an example embodiment, the more bubbles in the coating may allow for increased grip, but may also slightly decrease the abrasion resistance. In various embodiments, the middle foam coating layer 115 may include a composite of at least one of a nitrile latex (e.g., Synthomer X 6617), pH modifier (e.g., KOH solution), surfactant (e.g., SDBS and/or Foam stabilizer/BASF A-18), curing package (e.g., Sulphur dispersion, ZDEC dispersion, and/or ZnO dispersion), pigment/filler (e.g., TiO2 and/or Black pigment), and/or thickening agent (e.g., CMC solution). In various embodiments, the base coating layer 110 may be approximately 40% to 60% nitrile latex. In various embodiments, the base coating layer 110 may be approximately 40% to 50% nitrile latex. For example, the base coating layer 110 may be approximately 45% nitrile latex. In various embodiments, the thickness of the middle foam coating layer 115 may affect the gripping ability of the coated fabric (e.g., a higher thickness of the middle foam coating layer 115 and/or other layers may, in some examples, result in better performance, but with reduced abrasion resistance). In an example embodiment, the middle foam coating layer 115 may be approximately 0.50 millimeters to 0.60 millimeters. In various embodiments, the middle foam coating layer 115 may be thinner and/or thicker in various examples based on the abrasion resistance and/or grip requirements of the coated fabric.

In various embodiments, the outer foam coating layer 120 may be a wash foam coating. In various embodiments, the outer layer foam density may be higher than the middle layer foam density. In an example embodiment, the outer coating foam density may be approximately 0.80 kg/L. In various embodiments, the outer foam coating layer 120 may have less bubbles per square millimeter than the middle foam coating layer 115. For example, in an instance in which the outer layer foam density is approximately 0.80 kg/L, the outer foam coating layer 120 may have approximately 15 bubbles per square millimeter. As such, the outer foam coating layer 120 may provide increased abrasion resistance to the coated fabric, in some examples. In various embodiments, the outer layer foam density may be based on the desired abrasion resistance of the coated fabric. For example, the outer layer foam density may be approximately 0.8 kg/L in an instance the coated fabric is desired to give good abrasion resistance for 8000 cycles (e.g., the coated fabric may be capable of passing the EN 388 standard for 8000 cycles). In various embodiments, the coating may be adjusted in order to provide more abrasion resistance (e.g., capable of performing at the EN 388 standard for 15000 cycles or more). In various embodiments, the level of abrasion resistance may be based on the outer foam density (e.g., a lower foam density may be used for coated fabrics that require less abrasion resistance). In various embodiments, the thickness of the outer foam coating layer 120 may affect the abrasion resistance of the coated fabric (e.g., a higher thickness of the outer foam coating layer 120 may, in some examples, result in a higher abrasion resistance with reduced hand-feel (grip)). In an example embodiment, the outer foam coating layer 120 may be approximately 0.10 millimeters to 0.20 millimeters. In various embodiments, the outer foam coating layer 120 may be thinner and/or thicker in various examples based on the abrasion resistance and/or grip requirements of the coated fabric.

In various embodiments, the outer foam coating layer 120 may include a composite of at least one of a nitrile latex (e.g., X 6617 and/or XVT-LA), pH modifier (e.g., KOH solution), surfactant (e.g., SDBS), curing package (e.g., Sulphur dispersion, ZDEC dispersion, and/or ZnO dispersion), pigment/filler (e.g., TiO2 and/or Black pigment), and/or thickening agent (e.g., CMC solution). In various embodiments, the base coating layer 110 may be approximately 40% to 60% nitrile latex. In various embodiments, the base coating layer 110 may be approximately 40% to 50% nitrile latex. For example, the base coating layer 110 may be approximately 45% nitrile latex. In some embodiments, the outer foam coating layer 120 may have one or more bubbles 200, such that the liquid can penetrate the outer foam coating layer 120 and be absorbed by the middle foaming coating layer 115. For example, the wash foam process may allow for a thinning coating in which the holes have a higher diameter (e.g., as shown by the bubbles 200 in FIG. 2 compared to the bubbles 205). In such an embodiment, the outer foam coating layer 120 may remain relatively dry during use (e.g., remain relatively dry in an instance in which a liquid is introduced to the glove while being worn by the user).

Figure 4:
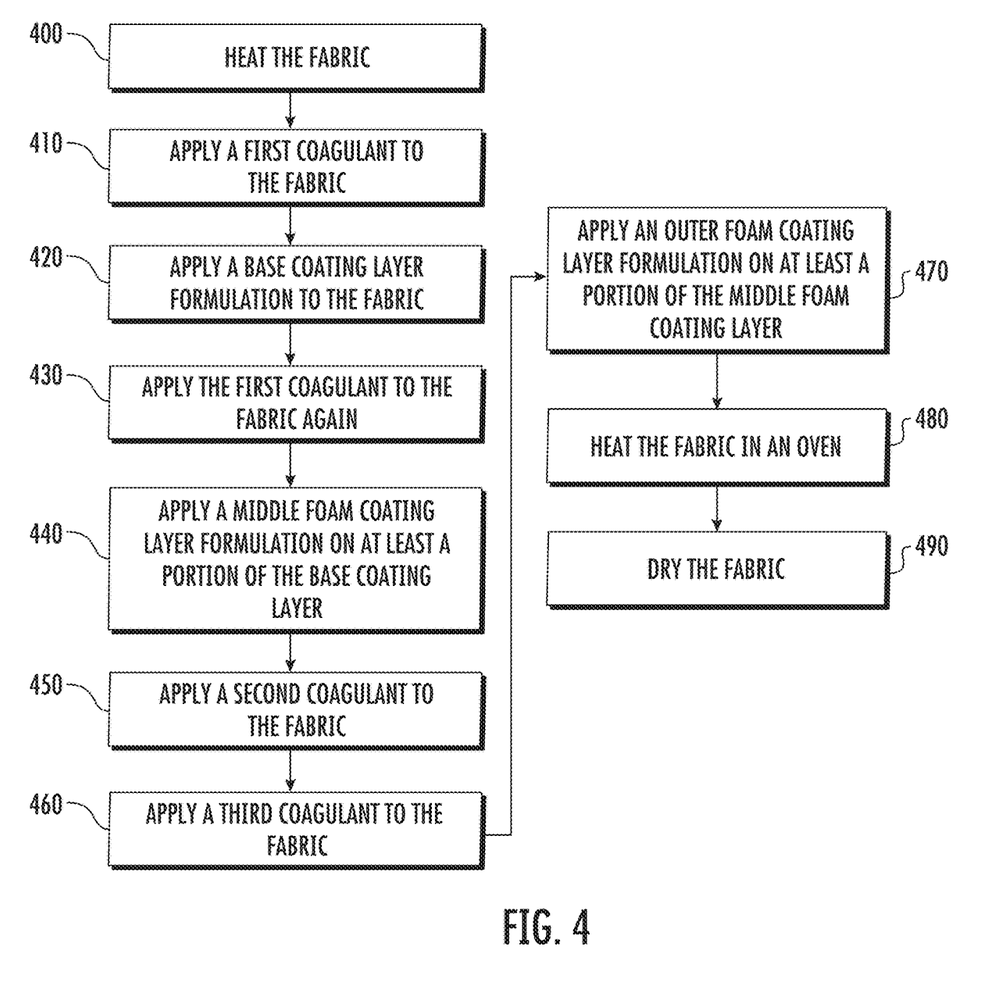
FIG. 4 is a flowchart of a method of manufacturing the three layer coated fabric in accordance with an example embodiment of the present disclosure.

Referring now to FIG. 4, a method of manufacturing a three layer coated fabric in accordance with various embodiments is provided. Various embodiments of the method described may be carried out in a different order than described herein, unless explicitly stated otherwise. Additional operations may also be completed during the method of manufacturing a three layer coated fabric, therefore the following steps are not exhaustive. In various embodiments, the three layer coated fabric may be a glove. In some steps discussed herein, temperatures referenced may only be exemplary and may not be prohibitive.

Referring now to Block 400 of FIG. 4, the method of manufacture may include heating the fabric. In some embodiments, the fabric may be heated on a model. For example, in an instance the fabric is a glove, the glove may be heated on a hand model. In various embodiments, the fabric may be heated to approximately 50 degrees Celsius. In various embodiments, different temperatures may be used in an instance in which pulse times are adjusted (e.g., a lower temperature may require a longer pulse time). For example, in some embodiments, the fabric may be heated to approximately 30 degrees Celsius to 70 degrees Celsius. Referring now to Block 410 of FIG. 4, the method of manufacture may include applying a first coagulant to the fabric. In various embodiment, the first coagulant may be a compound of a positive ion (e.g., calcium nitrate) and a solvent (e.g., methanol). In an example embodiment, the first coagulant may be approximately 1% to approximately 10% calcium nitrate. In some embodiments, the first coagulant may be approximately 1% to approximately 5% calcium nitrate. For example, the first coagulant may be approximately 2% calcium nitrate. In such an embodiment, the first coagulant may be approximately 98% methanol.

In an example embodiment, the first coagulant may be applied to the fabric by dipping the fabric into the first coagulant. In an example embodiment, the first coagulant may be applied to the fabric for approximately 60 second to 120 seconds. In an example embodiment, the fabric may be dipped into the first coagulant for approximately 80 seconds. For example, the fabric may be dipped into the first coagulant at a speed of approximately 3.7 centimeters per second (cm/s) with a stay time of 2 seconds, a leaching time of 5 seconds, and an evening time of 75 seconds (e.g., two cycles of dipping may be used to even the first coagulant). In some embodiments, the first coagulant may only be applied to a portion of the fabric (e.g., only the portion of the fabric in which the base coating layer is to be applied). For example, in an instance in which the fabric is a glove, only the palm of the glove may be dipped into the first coagulant.

Referring now to Block 420 of FIG. 4, the method of manufacture may include applying a base coating layer formulation to the fabric. As discussed above, the base coating layer formulation may be a smooth nitrile (e.g., a nitrile latex compound). In various embodiment, the base coating layer formulation may be applied by dipping the fabric into base coating layer formulation. In various embodiments, the applying of the base coating layer formulation may take approximately 3 to approximately 5 minutes. For example, the fabric may be dipped into the base coating layer formulation at a speed of approximately 3.7 centimeters per second (cm/s) with a stay time of approximately 2 second and an evening time of approximately 75 seconds (e.g., two cycles of dipping may be used to even the base coating layer). In some embodiments, the fabric may be shaken in the base layer coating formulation to remove excess nitrile rubber (e.g., to reduce the thickness of the coating). For example, the fabric may be shaken approximately 20 times to remove excess nitrile rubber. In various embodiments, less or no shaking may occur in an instance in which there are no thickness limitations. In various embodiments, the fabric may be rotated during the dipping process for uniform coating level. In some embodiments, the base coating layer may be pre-vulcanized after the application of the base coating layer formulation is completed. For example, the fabric may be heated at approximately 70 degrees Celsius for approximately 15 to 20 minutes before the steps of Block 430. In a preferred embodiment, the base coating layer 110 may be defined at least in the palm region and the interior of each digit of the coated fabric (e.g., in an instance in which the fabric is a glove shape). In some embodiment, the base coating layer may coating wrap partially around each digit at a digit proximal end and completely around the digit at a digit distal end.

Referring now to Block 430 of FIG. 4, the method of manufacture may include applying the first coagulant to the fabric again. In various embodiments, the first coagulant may be the same or similar coagulant discussed in reference to Block 410. In an example embodiment, the first coagulant may be applied to the fabric by dipping the fabric into the first coagulant. In an example embodiment, the first coagulant may be applied to the fabric for approximately 60 second to 120 seconds. In an example embodiment, the fabric may be dipped into the first coagulant for approximately 70 seconds. For example, the fabric may be dipped into the first coagulant at a speed of approximately 3.7 centimeters per second (cm/s) with a stay time of 1 seconds, a leaching time of 10 seconds, and an evening time of 60 seconds (e.g., two cycles of dipping may be used to even the first coagulant). In some embodiments, the first coagulant may only be applied to a portion of the fabric (e.g., only the portion of the fabric in which the middle foam coating layer is to be applied). For example, in an instance in which the fabric is a glove, only the palm of the glove may be dipped into the first coagulant.

Referring now to Block 440 of FIG. 4, the method of manufacture may include applying a middle foam coating layer formulation on at least a portion of the middle foam coating layer. As discussed above, the middle foam coating layer formulation may be a microfoam nitrile (e.g., a nitrile latex compound). In various embodiment, the middle foam coating layer formulation may be applied by dipping the fabric into middle foam coating layer formulation. In various embodiments, the applying of the middle foam coating layer formulation may take approximately 45 to 90 second (e.g., 60 seconds). For example, the fabric may be dipped into the middle foam coating layer formulation at a speed of approximately 3.7 centimeters per second (cm/s) with a stay time of approximately 10 second, a shaking time of approximately 15 seconds, and an evening time of approximately 60 seconds (e.g., two cycles of dipping may be used to even the middle foam coating layer). In some embodiments, the fabric may be shaken in the middle foam coating layer formulation to remove excess nitrile rubber (e.g., to reduce the thickness of the coating). In various embodiments, the shaking of the fabric may allow the middle foam coating layer to be thinner and spongy than an instance in which the fabric is not shaken during the application. In various embodiments, the fabric may be rotated during the dipping process for uniform coating level. In various embodiments, the resulting middle foam coating layer may have a middle layer foam density of approximately 0.25 kilograms (kg) per Liter (L) to approximately 0.60 kg/L. In some embodiment, the middle layer foam density may be from approximately 0.45 kg/L to approximately 0.60 kg/L. For example, the middle layer foam density may be approximately 0.60 kg/L. In a preferred embodiment, the middle foam coating layer 115 may deposited on at least a portion of the base coating layer. For example, the middle foam coating layer 115 may be defined at least in the palm region and the interior of each digit of the coated fabric (e.g., in an instance in which the fabric is a glove shape). In some embodiment, the middle foam coating layer may coating wrap partially around each digit at a digit proximal end and completely around the digit at a digit distal end.

Referring now to Block 450 of FIG. 4, the method of manufacture may include applying a second coagulant to the fabric. In various embodiment, the second coagulant may be a compound of a positive ion (e.g., acetic acid) and a solvent (e.g., methanol). In an example embodiment, the second coagulant may be approximately 1% to approximately 10% acetic acid. In some embodiments, the second coagulant may be approximately 1% to approximately 5% acetic acid. For example, the second coagulant may be approximately 4% acetic acid. In such an embodiment, the second coagulant may be approximately 96% methanol.

In an example embodiment, the second coagulant may be applied to the fabric by dipping the fabric into the second coagulant. In an example embodiment, the second coagulant may be applied to the fabric for approximately 60 second to 120 seconds. In an example embodiment, the fabric may be dipped into the second coagulant for approximately 80 seconds. For example, the fabric may be dipped into the second coagulant at a speed of approximately 3.7 centimeters per second (cm/s) with a stay time of approximately 1 seconds until the middle foam coating layer 115 may be approximately fully coagulated. In some embodiments, the second coagulant may only be applied to a portion of the fabric (e.g., only the portion of the fabric in which the outer foam coating layer 120 is to be applied). For example, in an instance in which the coated fabric is a glove, only the palm of the glove may be dipped into the second coagulant. In some embodiments, the fabric may be rotated while being dipped into the second coagulant. In various embodiments herein, other methods of application may be used other than dipping (e.g., spraying) for one or more of the applications of the coating formulations and/or coagulants discussed herein.

Referring now to Block 460 of FIG. 4, the method of manufacture may include applying a third coagulant to the fabric. In various embodiment, the third coagulant may be a compound of a positive ion (e.g., calcium nitrate) and a solvent (e.g., methanol). In an example embodiment, the third coagulant may be approximately 30% to approximately 50% calcium nitrate. In some embodiments, the third coagulant may be approximately 40% to approximately 50% calcium nitrate. For example, the third coagulant may be approximately 50% calcium nitrate. In such an embodiment, the third coagulant may be approximately 50% methanol.

In an example embodiment, the third coagulant may be applied to the fabric by dipping the fabric into the third coagulant. In an example embodiment, the third coagulant may be applied to the fabric for approximately 90 second to 150 seconds. In an example embodiment, the fabric may be dipped into the third coagulant for approximately 120 seconds. For example, the fabric may be dipped into the third coagulant at a speed of approximately 3.7 centimeters per second (cm/s) with a stay time of approximately 5 seconds, a leaching time of approximately 5 seconds, and an evening time of approximately 110 seconds. In some embodiments, the third coagulant may only be applied to a portion of the fabric (e.g., only the portion of the fabric in which the outer foam coating layer 120 is to be applied). For example, in an instance in which the fabric is a glove, only the palm of the glove may be dipped into the third coagulant. In various embodiments, the fabric may be rotated while being dipped into the third coagulant.

Referring now to Block 470 of FIG. 4, the method of manufacture may include applying an outer foam coating layer formulation on at least a portion of the middle foam coating layer. As discussed above, the outer foam coating layer formulation may be a wash foam nitrile (e.g., a nitrile latex compound). In various embodiment, the outer foam coating layer formulation may be applied by dipping the fabric into outer foam coating layer formulation. In some embodiments, the outer foam coating layer formulation may be applied to the fabric by using a dive dipping process. In various embodiment, the fabric may be dipped into the outer foam coating layer formulation for a few seconds (e.g., approximately 2 seconds) until the outer foam coating layer 120 is partly coagulated and then removed. For example, the fabric may be dipped into the outer foam coating layer formulation for two seconds, shook twice and then removed. As such, the process, in some examples, may take substantially less time than the application of the base coating layer or the middle foam coating layer. In various embodiments, the resulting outer foam coating layer 120 may have an outer layer foam density of approximately 0.7 kg/L to approximately 0.9 kg/L. In various embodiments, the resulting outer foam coating layer 120 may have an outer layer foam density higher than the middle layer foam density (e.g., the outer layer foam density may be approximately 0.80 kg/L). In some embodiments, the outer foam coating layer formulation may only be applied to a portion of the fabric. For example, in an instance in which the fabric is a glove, only the palm of the glove may be dipped into the outer foam coating layer formulation. In various embodiments, the fabric may be rotated while being dipped into the outer foam coating layer formulation.

In some embodiments, after the fabric has been dipped into the outer foam coating layer formulation, the fabric may be rinsed (e.g., to remove the uncoagulated coating from the surface of the fabric). For example, the fabric (e.g., a glove) may be rinsed using a soft wash (e.g., low pressure and low flow) using quadrant elevation wash for approximately 60 seconds or longer. In a preferred embodiment, the outer foam coating layer 120 may deposited on at least a portion of the middle foam coating layer. For example, the outer foam coating layer 120 may be defined at least in the palm region and the interior of each digit of the coated fabric (e.g., in an instance in which the fabric is a glove shape). In some embodiment, the outer foam coating layer may coating wrap partially around each digit at a digit proximal end and completely around the digit at a digit distal end.

Referring now to Block 480 of FIG. 4, the method of manufacture may include heating the fabric in an oven. In various embodiments, one or more of the coatings may be vulcanized during the heating process. For example, the fabric (e.g., a glove) may be placed in an oven at a set temperature for a set amount of vulcanize the coating. The temperature of the oven and the amount of time in the oven may be based on the coating formulations. For example, the coated fabric may be placed in an oven at 100 degrees Celsius for 60 minutes. In an example embodiment, the vulcanization process may use a plurality of ovens at different temperatures to vulcanize the coating. For example, the coated fabric may be placed for 20 minutes each into a first oven at approximately room temperature, a second oven at approximately 70 degrees Celsius, a third oven at approximately 90 degrees Celsius, and a fourth oven at approximately 110 degrees Celsius. Various embodiments may use a different number of ovens (e.g., one oven) to vulcanize the coating. In some embodiments, there may also be a pre-vulcanization before the heating in the oven (e.g., the coated fabric may be heated at 70 degree Celsius). Additionally, there may be one or more washing of the coated fabric before the vulcanization (e.g., an online wash may be carried out for approximately 10 minutes at approximately 50 degrees before the vulcanization). In various embodiments, the vulcanization may cause a chemical reaction in one or more layers of the coated fabric (e.g., a chemical reaction in which the sulfar and/or zinc oxide in the one or more coating layers may cross-link with one or more latex material in the coating layers may occur in one or more coating layers).

Referring now to Block 490 of FIG. 4, the method of manufacture may include drying the fabric. In various embodiments, after the coating has been vulcanized, the fabric may be removed from a model (e.g., the glove may be removed from the hand model). In some embodiments, additional offline washing may occur to remove any excess nitrile rubber. In some embodiments, the drying of the fabric may occur in an oven (e.g., the same or a different oven from the oven used to vulcanized the fabric. In various embodiments, the drying of the fabric (e.g., gloves) assists the formation of open-cell foam on coating.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A coated fabric comprising:
a base coating layer, the base coating layer defining a smooth coating to resist liquid penetration to the fabric;
a middle foam coating layer that is deposited on at least a portion of the base coating layer, the middle foam layer defining a middle layer foam density and the middle foam layer being configured to absorb at least a portion of liquid; and
an outer foam coating layer that is deposited on at least a portion of the middle foam coating layer, the outer foam layer defining an outer layer foam density and the outer foam layer being configured with holes to allow liquid to penetrate to the middle foam layer, such that the outer foam layer increases the abrasion resistance of the coated fabric,
wherein the middle layer foam density is from 0.25 kg/L to 0.60 kg/L, and
wherein the middle layer foam density is less than the outer layer foam density.

2. The coated fabric of claim 1, wherein the middle layer foam density is from 0.45 kg/L to 0.60 kg/L.

3. The coated fabric of claim 1, wherein the outer layer foam density is from 0.70 kg/L to 0.9 kg/L.

4. The coated fabric of claim 1, wherein at least one of the base coating layer, the middle foam coating layer, or the outer foam coating layer comprise a nitrile compound.

5. The coated fabric of claim 4, wherein the nitrile compound of the at least one of the base coating layer, the middle foam coating layer, or the outer foam coating layer comprises 45% nitrile latex.

6. The coated fabric of claim 1, wherein the coated fabric is used to form a glove.

7. The coated fabric of claim 6, wherein each of the base coating layer, the middle foam coating layer, and the outer foam coating layer are applied at least to a palm area of the glove.

8. The coated fabric of claim 6, wherein the glove is one of a mechanical glove or a chemical glove.

9. The coated fabric of claim 1, wherein the base coating layer further comprises a nylon lining.

\* \* \* \* \*